Dec. 14, 1926.
H. F. HITNER
1,610,377
APPARATUS FOR MAKING GLASS
Original Filed August 20, 1925    3 Sheets-Sheet 1
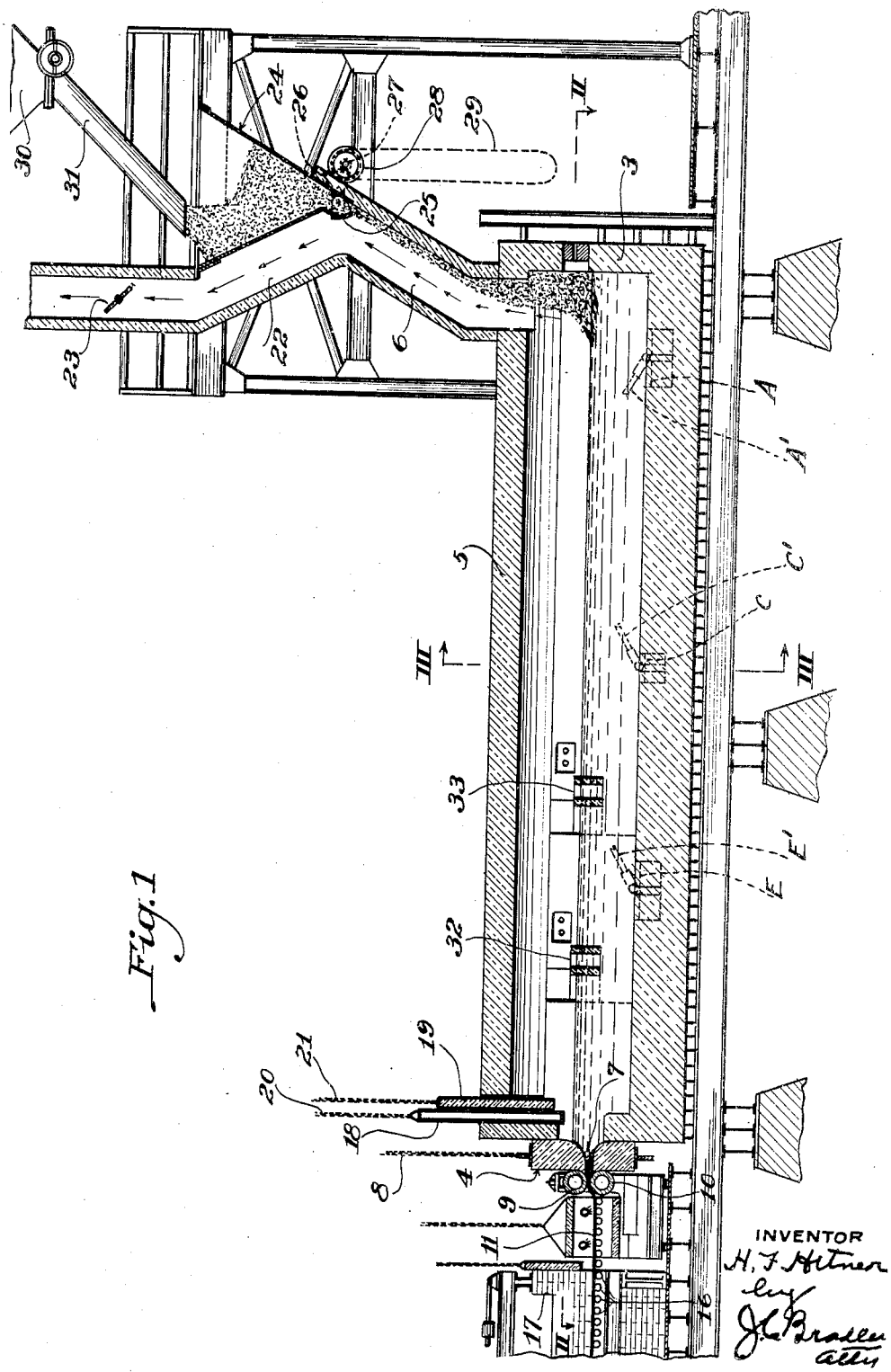

Dec. 14, 1926.
H. F. HITNER
1,610,377
APPARATUS FOR MAKING GLASS
Original Filed August 20, 1925    3 Sheets-Sheet 2
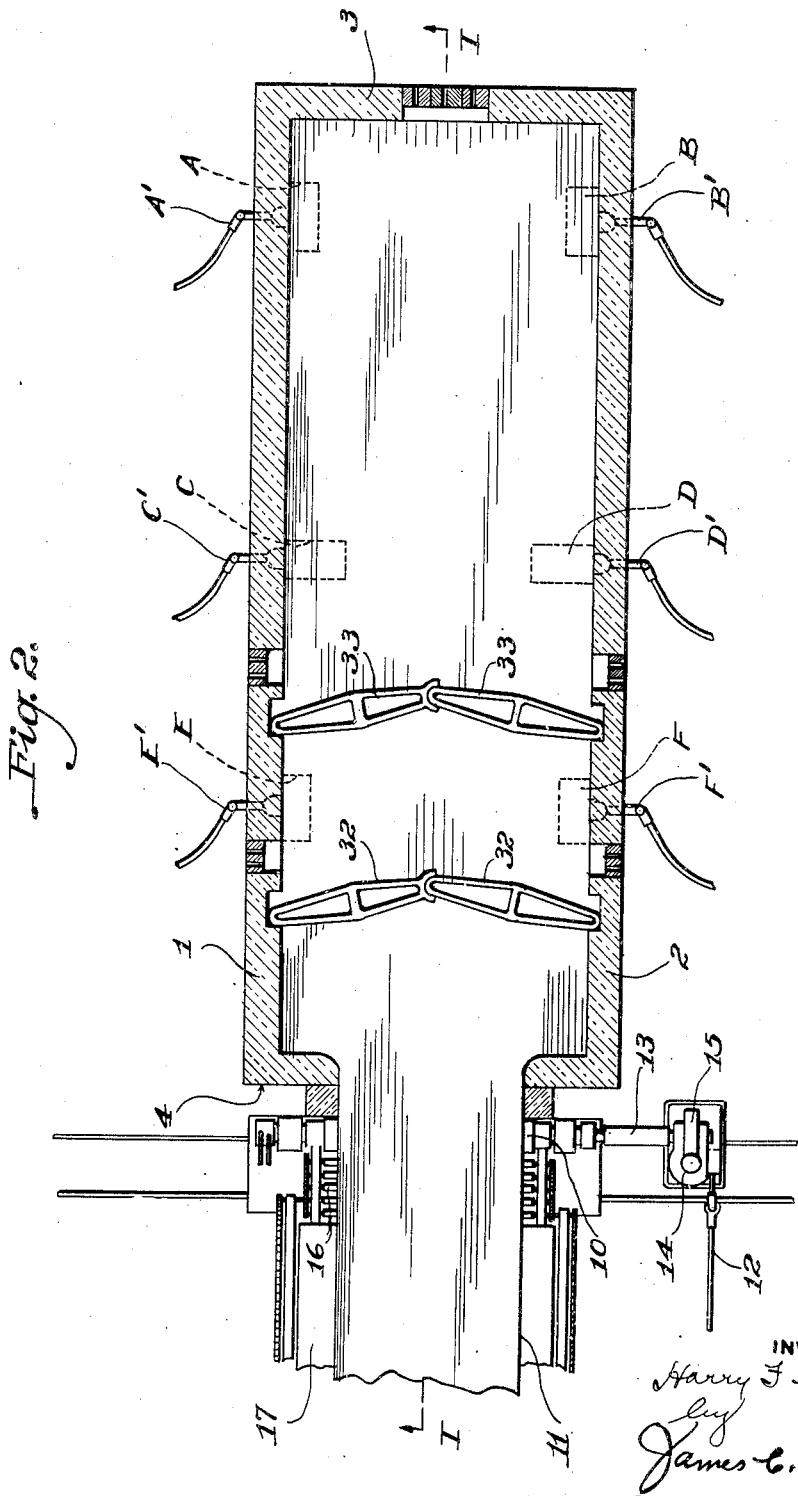
INVENTOR
Harry F. Hitner
by
James C. Bradley
Att.

Dec. 14, 1926.

H. F. HITNER 1,610,377

APPARATUS FOR MAKING GLASS

Original Filed August 20, 1925   3 Sheets-Sheet 3

INVENTOR
Harry F. Hitner
by
James C. Bradley
att.

Patented Dec. 14, 1926.

1,610,377

UNITED STATES PATENT OFFICE.

HARRY F. HITNER, OF PITTSBURGH, PENNSYLVANIA, ASSIGNOR TO PITTSBURGH PLATE GLASS COMPANY, A CORPORATION OF PENNSYLVANIA.

APPARATUS FOR MAKING GLASS.

Application filed August 20, 1925, Serial No. 51,325. Renewed April 17, 1926.

Figure 4:
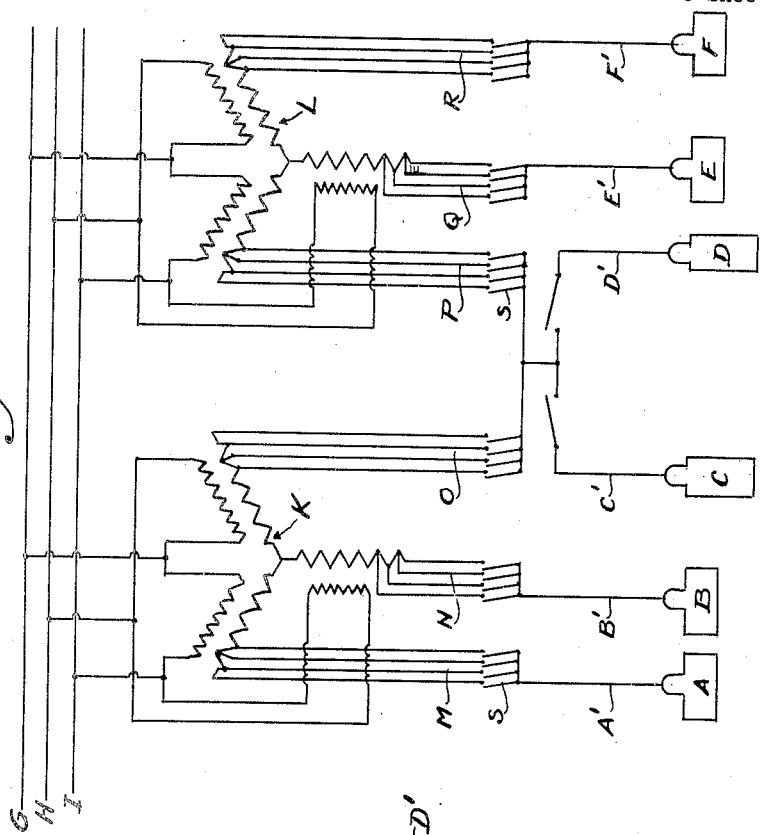
Figure 3:
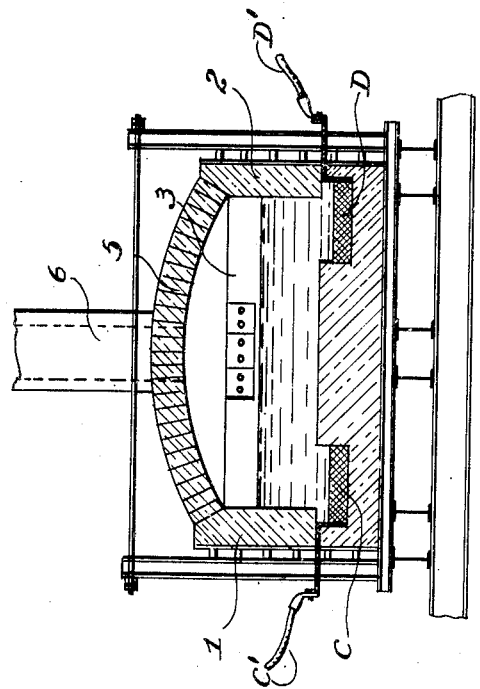

The invention relates to an apparatus for making glass by the use of electricity as a melting and fining agent. The apparatus constitutes a modification of that shown in my copending application, Serial No. 51,324, of even date herewith; such application disclosing the use of plate electrodes set into the sides of the tank and designed to be used with single phase current, while the apparatus of the present application discloses the use of electrodes in the form of pools of molten metal in the bottom of the melting tank arranged so as to be used with three phase current. The feature of arranging the electrodes in pairs in spaced relation longitudinally of the tank and adapted to secure a flow of current through the glass longitudinally of the tank, and also transversely, is common to both applications, the broad claims to this feature being presented in said copending application. As in such other application, the gases above the glass are withdrawn at the rear end of the tank, so as to preliminarily heat the incoming batch. The objects of the invention are to provide for heating the glass thoroughly and uniformly in a economical way. and to prevent any reaction between the electrodes and the glass such as would cause a discoloration of the glass or injury to its quality due to such reaction. In its preferred form, the invention contemplates the use of three phase current in conjunction with two transformers designed so as to give different voltages, the higher voltage being applied to the reduction of the batch in the rear section of the tank, to which it is better adapted than the lower voltage, while the lower voltage is applied to the fining of the glass in the tank section forward of such rear section. One embodiment of the invention is illustrated in the accompanying drawings wherein:

Figure 1 is a vertical section through the apparatus on the line I—I of Fig. 2. Fig. 2 is a horizontal section on the line II—II of Fig. 1. Fig. 3 is a transverse section on the line III—III of Fig. 1. And Fig. 4 is a wiring diagram.

Referring to the drawings, 1, 2 are the side walls of an elongated melting tank; 3 and 4 are the rear and forward end walls respectively; and 5 is the arch or roof of the tank. Batch is supplied to the rear end of the tank through the chute 6 and the finished glass is withdrawn continuously from the forward end of the tank through the slot 7 in the front wall 4, such wall being preferably made vertically adjustable or removable by means of chains 8 connected to a suitable overhead handling device.

The glass flowing through the slot 7 passes between the sizing rolls 9 and 10 in a continuous ribbon 11, the sizing rolls being water cooled and driven from the shaft 12 (Fig. 2) through the intermediary of the tumbler shafts 13 and suitable reducing gearing in the casings 14 and 15. The ribbon is received from an apron provided with fluid cooled rolls 16 and passes from this apron into a leer 17, which is preferably of the roller type, and is of such length that the glass is suitably annealed and cooled before reaching the far end of the leer where it is cut into sheets. Provision is made for cutting off the flow of glass from the outlet slot 7 in the form of a pair of gates or shear cakes 18 and 19, the gate 18 being water cooled, and the gate 19 being of refractory material. These gates are supported by the chains 20 and 21 extending upward to a suitable handling apparatus, such as an overhead crane.

The hot gases which accumulate above the surface of the glass in the tank are carried out through the chute 6 and through the passageway 22 leading to a stack and provided with a suitable regulating damper 23. The passageway 22 is arranged along one side of the batch hopper 24, and this batch hopper is provided at its lower end with a gate 25 secured to a segmental rack 26 which is operated by the pinion 27. This pinion is carried by the shaft upon which the wheel 28 is mounted and this wheel may be turned from the depending endless chain 29. The hopper 24 is supplied from a bin 30 having a chute 31 discharging to the hopper.

Located in the bottom wall of the tank along the sides thereof are the pairs of electrodes A—B, C—D, and E—F, such electrodes being in the form of pools of molten metal, heavier than glass, such as lead, antimony or copper, the metal selected being one which will not react with the glass at the temperatures at which the apparatus is operated. Of the three metals specified, the antimony is preferred, as upon oxidation, it does not form a corrosive flux and attack the furnace lining, as is the case with both the lead and the copper. Further, antimony oxide does not color the glass and has been found to be a desirable ingredient in the batch, because of its effect in fining the glass. On the other hand, lead oxide tends to give the glass a yellow tinge, while copper oxide gives it a blue tinge. The surfaces of these pools of metal are preferably located slightly below the level of the bottom of the tank, and current is supplied to the pools by means of lead-in terminals A', B', C', D', E', and F', which extend into the molten metal constituting the pools.

The current employed is alternating and three phase from the leads G, H and I. K is the secondary of a high voltage transformer and L is the secondary of another transformer for giving lower voltage. Leading from the branches of the transformer windings are the sets of connections M, N, O, P, Q and R which connect with the lead-in terminals A', B', C', D', E', and F', as indicated in Fig. 4. Each set of connections, as for instance, the set M is provided with the plurality of switches S, S, etc., so that the voltage supplied the terminal A' will vary with the particular switch which is closed, thus giving a means for regulating the voltage flowing through the glass and depending upon requirements. The arrangement permits of giving the heating current for the glass a large number of different paths through the body of glass so that it is thoroughly and uniformly heated. A flow may be secured between A and D, between A and C and between A and B. Similarly, a flow may occur between B and D and between B and C. In addition to this, a similar series of paths of flow may be secured between the electrodes C, D, E and F, as for instance, between C and E and C and F, or between D and F and D and E.

The melting of the batch is accomplished by the high voltage current between the electrodes A, B, C and D which is better adapted to this work than the lower voltage, while the fining action is secured by the flow of current between the electrodes C, D, E and F. The spacing of the electrodes and the current supplied may be varied to suit conditions and requirements. A very close regulation of temperature may be secured and a product of a high quality produced. The glass is skimmed in the usual way by means of the sets of floaters 32—32, and 33—33. A very considerable degree of economy is secured because the energy of the current is utilized and the radiation losses from the furnace are relatively slight as compared with a gas heated furnace. Furthermore, with this type of furnace, the heated gases above the glass may be utilized for heating the incoming batch, an economy not possible with gas heated furnaces. The process also involves a saving in alkali, as the vaporized alkali, ordinarily lost and amounting to something like 15 per cent, which is condensed and returned with the incoming batch.

What I claim is:

1. In combination in apparatus for making glass, a melting tank arranged to receive batch at one end and deliver molten glass at the other end, a plurality of electrodes in the bottom of the tank along each side thereof in spaced relation and each comprising a pool of molten metal, and means for supplying current to the electrodes so as to cause the flow thereof to pass through the glass longitudinally of the tank.

2. In combination in apparatus for making glass, a melting tank arranged to receive batch at one end and deliver molten glass at the other end, a plurality of electrodes in the bottom of the tank along each side thereof in spaced relation and each comprising a pool of molten metal, and means for supplying current to the electrodes so as to cause the flow thereof to pass through the glass longitudinally of the tank and also transversely thereof.

3. In combination in apparatus for making glass, a melting tank arranged to receive batch at one end and deliver molten glass at the other end, a plurality of electrodes in the bottom of the tank along each side thereof in spaced relation and each comprising a pool of molten metal, and means for supplying current to the electrodes so as to cause the flow thereof to pass through the glass diagonally of the tank in a plurality of paths.

4. In combination in apparatus for making glass, a melting tank arranged to receive batch at one end and deliver molten glass at the other end, a plurality of electrodes in the bottom of the tank, along each side thereof in spaced relation, and each comprising a pool of molten metal, and means for supplying current to the electrodes so as to cause the flow thereof to pass through the glass longitudinally of the tank and also transversely and diagonally thereof.

5. In combination in apparatus for making glass, a melting tank arranged to receive batch at one end and deliver molten glass at the other end, three electrodes in the bottom of the tank in spaced relation longitudinally thereof, and each comprising a pool of molten metal and means for supplying current to the electrodes so as to cause a flow thereof longitudinally of the tank between the middle electrode and the electrode lying on each side thereof.

6. In combination in apparatus for making glass, a melting tank arranged to receive batch at one end and deliver molten glass at the other end, three electrodes in the bottom of the tank on each side thereof in spaced relation longitudinally thereof, and each comprising a pool of molten metal, and means for supplying current to the electrodes, so as to cause a flow thereof longitudinally of the tank between the middle electrodes and the end electrodes lying on each side thereof, and also so as to cause the flow of current transversely of the tank between each pair of end electrodes.

7. In combination in apparatus for making glass, a melting tank arranged to receive batch at one end and deliver molten glass at the other end, three electrodes in the bottom of the tank on each side thereof in spaced relation longitudinally thereof, and comprising a pool of molten metal, and means for supplying current to the electrodes, so as to cause a flow thereof longitudinally of the tank between the middle electrodes and the end electrodes lying on each side thereof, and also so as to cause a flow of current diagonally of the tank between each of the middle electrodes and the end electrodes on the sides of the tank opposite therefrom.

8. In combination in apparatus for making glass, a melting tank arranged to receive batch at one end and deliver molten glass at the other end, three electrodes in the bottom of the tank on each side thereof in spaced relation longitudinally thereof, and each comprising a pool of molten metal, and means for supplying current to the electrodes, so as to cause a flow thereof diagonally of the tank between each of the middle electrodes and the end electrodes on the sides of the tank opposite therefrom.

9. In combination in apparatus for makin glass, a melting tank arranged to receive batch at one end and deliver molten glass at the other end, three electrodes in the bottom of the tank in spaced relation longitudinally thereof, and each comprising a pool of molten metal and means for supplying current to the electrodes so as to cause a flow thereof longitudinally of the tank between the middle electrode and the electrode lying on one side thereof of one voltage, and another flow longitudinally of the tank between the middle electrode and the electrode on the other side thereof of a voltage different from the first voltage.

10. In combination in apparatus for making glass, a melting tank arranged to receive batch at one end and deliver molten glass at the other end, three electrodes in the bottom of the tank in spaced relation longitudinally thereof, and each comprising a pool of molten metal and means for supplying current to the electrodes so as to cause a flow thereof longitudinally of the tank between the middle electrode and the electrode lying on one side thereof of one voltage, and another flow longitudinally of the tank between the middle electrode and the electrode on the other side thereof of a voltage different from the first voltage, the higher voltage being applied on the side of the middle electrode toward the rear end of the tank.

11. In combination in apparatus for making glass, a melting tank arranged to receive batch at one end and deliver molten glass at the other end, three electrodes in the bottom of the tank on each side thereof in spaced relation longitudinally thereof, and each comprising a pool of molten metal, and means for supplying current to the electrodes, so as to cause a flow thereof longitudinally of the tank between the middle electrodes and the end electrodes lying on each side thereof, and also so as to cause the flow of current transversely of the tank between each pair of end electrodes, the voltage of the current flowing between the middle electrodes and the end electrodes to the rear thereof being higher than the voltage of the current between such middle electrodes and the end electrodes forward thereof.

12. In combination in apparatus for making glass, a tank or container adapted to carry a body of molten glass, and means for heating the glass comprising a pair of electrodes covered by the glass and each consisting of a pool of molten antimony and means for supplying current to the electrodes, so as to cause the flow thereof to pass through the glass.

In testimony whereof, I have hereunto subscribed my name this 18th day of July, 1925.

HARRY F. HITNER.